United States Patent
Nakamura et al.

[11] Patent Number: 5,880,965
[45] Date of Patent: Mar. 9, 1999

[54] METHOD OF CONTROLLING A SHEET METAL MACHINING LINE AND APPARATUS FOR CONTROLLING THE SAME

[76] Inventors: Kaoru Nakamura, 2-18-13, Takamori, Isehara-shi, Kanagawa, 259-11; Nobuaki Tamura, 3-6-11-102, Higashirinkah, Sagamihara-shi, Kanagawa, 228; Toshiyuki Koike, 2-8-5-302, Higashiotake, Isehara-shi, Kanagawa, 259-Il, all of Japan

[21] Appl. No.: 759,527
[22] Filed: Dec. 5, 1996
[51] Int. Cl.⁶ .................................................. G06F 19/00
[52] U.S. Cl. ................................ 364/474.17; 364/468.07
[58] Field of Search .............................. 364/185, 468.06, 364/468.08, 468.15, 468.16, 474.01, 474.16, 474.17, 468.07

[56] References Cited

U.S. PATENT DOCUMENTS

| | | | |
|---|---|---|---|
| 4,237,598 | 12/1980 | Williamson | 483/4 |
| 4,473,883 | 9/1984 | Yoshida et al. | 364/474.21 |
| 5,428,547 | 6/1995 | Ikeda | 364/474.16 |
| 5,446,672 | 8/1995 | Boldys | 364/474.16 |
| 5,488,564 | 1/1996 | Ikeda | 364/474.16 |
| 5,548,535 | 8/1996 | Zvonar | 702/81 |

Primary Examiner—Paul P. Gordon
Assistant Examiner—Sheela S. Rao
Attorney, Agent, or Firm—Greenblum & Bernstein, P.L.C.

[57] ABSTRACT

A cell controller is provided that analyzes each unit machining schedule, which is referred to for manufacturing products, prior to the start of the assigned unit machining schedule. The data items in the schedule are analyzed include identification numbers of machining programs, the use or non-use of such identification numbers, the number of workpieces to be machined, and a presence or absence of predetermined procedures (e.g., for exchanging metal molds, etc.) that are referred to for manufacturing the products. An operator is notified of any foreseeable schedule alarm condition, that will force the operation of the line of manufacturing products of a specific item to be suspended, so that the operator may be informed of the situation in advance. The foreseeable schedule alarm condition may arise for reasons such as an insufficient number of available workpieces and/or preparatory work to be done (e.g., an exchange of metal molds, etc.).

21 Claims, 7 Drawing Sheets

METHOD OF CONTROLLING A SHEET METAL MACHINING LINE AND APPARATUS FOR CONTROLLING THE SAME

BACKGROUND OF THE INVENTION

1. Field of the Invention

This invention generally relates to a method of controlling a sheet metal machining line for producing desired products by cutting, drilling, bending and/or otherwise machining flat workpieces according to a machining schedule prepared on the basis of a given production plan. More particularly, the invention relates to a method of controlling a sheet metal machining line designed to foresee an unfavorable situation that can force the operation of the line of manufacturing products of a specific item to be suspended for reasons, such as no available workpieces and/or a preparatory work to be done such as an exchange of metal molds, that can arise before or during the machining operation for the products. The control method includes analyzing the unit machining schedule or schedules for the products including the data items described in the schedule or schedules, such as the identification numbers of the machining programs involved, the use or non-use of such identification numbers, the number of workpieces to be machined and the presence or absence of the predetermined procedures for exchanging metal molds to be referred to for manufacturing the products, and informing the operator of the foreseen situation or the non-existence of such a foreseen unfavorable situation in order to make the operator prepared for a possible suspension of the operation of the line.

The present invention also relates to an apparatus for controlling a sheet metal machining line by using such a control method.

2. Background Information

Automated power saving manufacturing systems such as flexible manufacturing system (FMS) have been known and in popular use in sheet metal machining lines for cutting, drilling, bending and otherwise treating sheet metals into intended products.

An apparatus for controlling a sheet metal machining line utilizing an FMS system will be summarily described. A sheet metal machining line typically comprises an NC machining center including one or more punch presses adapted to selectively use a plurality of metal molds and tools, a CNC control apparatus for controlling the operation of the NC machining center according to a machining program, a workpiece holding/releasing unit for holding one or more workpieces to be machined in position relative to the NC and releasing them for delivery, an automatic warehouse for sorting a large number of workpieces into groups of same materials and sizes and storing them for future machining, peripheral equipment including one or more cranes and other devices for feeding workpieces to the workpiece holding/releasing unit from the automatic warehouse, and a line control board connected to the NC machining center, the CNC control apparatus and the peripheral equipment for controlling the sequence of operations of the sheet metal machining line. The sheet metal machining line is additionally connected to a cell controller for transferring machining programs to the CNC control apparatus and also transferring ladder-sequence programs to the line control board in order to control the entire operation of the sheet metal machining line in a coordinated manner.

The cell controller is connected to a hard disc memory device having a predetermined capacity typically for storing machining schedules prepared according to a given production plan describing the operating procedures of the NC machining center and the peripheral equipment for sequentially producing products according to the production plan. The cell controller sequentially issues commands for operation according to the machining schedule and the issued operational commands are then sent to the CNC control apparatus and the line control board. Upon receiving the commands, the sheet metal machining line sequentially carries out the specified machining operations including cutting, drilling and bending on the delivered flat workpieces.

A machining schedule typically comprises one or more unit machining schedules designed for each specific product item and arranged, if more than one unit machining schedule is used, in the order of the machining operations to be carried out.

The machining schedule describes data items such as the identification numbers of the machining programs involved, the use or non-use of such identification numbers, the number of workpieces to be machined the presence or absence of the predetermined procedures for exchanging metal molds, and completion codes for indicating the completion of the operations specified in the unit machining schedule. The cell controller causes the predetermined machining operations to be carried out in the order defined by the machining schedule by referring to the machining schedule whenever necessary so that groups of products may be produced according to the machining schedule.

However, a known apparatus for controlling a sheet metal machining line having a configuration as described above can inevitably be brought into a situation that can arise before or during the machining operation conducted according to a unit machining schedule to force the operation of the line of manufacturing products of a specific item to be suspended. Such a situation may be that the number of available workpieces is short of the number of workpieces to be machined, that the machining operations for the current unit machining schedule are over but the machining program required for carrying out the next unit machining schedule is not at hand or that there is preparatory work to be done by the operator such as an exchange of metal molds. A very skilled operation may not be able to foresee the time when the line is suspended due to such a situation. Therefore, there is a need for technological development that can solve this problem.

Thus, the operator is currently required to constantly watch the sheet metal machining line and also respond to unusual conditions that may require the preparation of an additional machining program, an additional supply of workpieces and/or the performance of preparatory work for exchanging metal molds. Constantly watching the sheet metal machining line and concurrently carrying out a preparatory work at the same time can constitute an extraordinary heavy workload for the operator both physically and mentally. In view of the above circumstances, it has been desired to provide a novel technological development that can foresee an unfavorably situation that can force the operation of the sheet metal machining line to be suspended and to notify the operator of the foreseen situation well before the start of the operation.

SUMMARY OF THE INVENTION

In view of the above identified technological problems, it is therefore an object of the present invention to provide a method and an apparatus of controlling a sheet metal machining line designed to foresee an unfavorable situation that can force the operation of the line of manufacturing products of a specific item to be suspended for reasons such as no machining program in position, no available workpieces and/or a preparatory work to be done such as an exchange of metal molds that can arise before or during the machining operation for the products. The method includes analyzing the unit machining schedule or schedules for the products including the data items described in the schedule or schedules such as the identification numbers of the machining programs involved, the use or non-use of such identification numbers, the number of workpieces to be machined and the presence or absence of the predetermined procedures for exchanging metal molds to be referred to for manufacturing the products, informing the operator of the foreseen situation or the non-existence of such a foreseen unfavorable situation in order to make the operator prepared for a possible suspension of the operation of the line.

Another object of the present invention is to provide a method and an apparatus for controlling a sheet metal machining line that can efficiently operates the sheet metal machining line.

In an aspect for achieving the above objects, the present invention provides a method of controlling a sheet metal machining line by using a machining schedule comprising one or more than one unit machining schedules arranged in the order of the machining operations to be carried out, if more than one unit machining schedules are used, and designed to be referred to for the objects to be machined and containing data items including the identification numbers of the machining programs involved, the number of workpieces to be machined and/or the presence or absence of preparatory work to be done as well as completion codes for indicating the completion or non-completion of the operations specified in the unit machining schedule or schedules so that each of the supplied flat workpieces may be sequentially machined with predetermined machining procedures according to the machining schedule, wherein it comprises steps of assigning the unit machining schedule or schedules specified as non-completion by a completion code and conforming to a predetermined order, determining the presence or absence of a foreseeable schedule alarm condition that forces the operation of the sheet metal machining line to be suspended before or during the machining operation for the assigned unit machining schedule or schedules by analyzing the data items of the assigned unit machining schedule or schedules and notifying the operator of the presence of a foreseeable schedule alarm condition if it is so determined in the preceding step.

With the above arrangement, a processing operation of assigning the unit machining schedule or schedules specified as non-completion by a completion code and conforming to a predetermined order is firstly carried out. Then, it is determined if there is a foreseeable schedule alarm condition that forces the operation of the sheet metal machining line to be suspended before or during the machining operation for the assigned unit machining schedule or schedules by analyzing the data items of the assigned unit machining schedule or schedules. The operator is notified of the presence of a foreseeable schedule alarm condition if it is so determined in the preceding step.

Thus, any unfavorable situation that can force the operation of the line of manufacturing products of a specific item to be suspended for reasons such as no machining program in position, no available workpieces and/or a preparatory work to be done such as an exchange of metal molds that can arise before or during the machining operation for the products can be predicted by analyzing the unit machining schedule or schedules for the products assigned as conforming to a predetermined order and the operator is notified of the foreseeable unfavorable situation so that the operator can be prepared for a possible suspension of the operation of the line before the machining operation for the products.

In a preferred embodiment, the operator is notified of a schedule alarm condition and the cause thereof if it is determined that such a schedule alarm condition is foreseeable.

With this preferred embodiment, the operator is notified of a schedule alarm condition and the cause thereof if it is determined that such a schedule alarm condition is foreseeable. Then, the operator can quickly respond to such a situation because he or she is aware of the predicted possible schedule alarm condition well before the start of the operation of machining workpieces for the products in question.

In another aspect for achieving the above objects, the present invention provides a method of controlling a sheet metal machining line by using a machining schedule comprising one or more than one unit machining schedules arranged in the order of the machining operations to be carried out, if more than one unit machining schedules are used, and designed to be referred to for the objects to be machined and containing data items including the identification numbers of the machining programs involved, the number of workpieces to be machined and/or the presence or absence of preparatory work to be done as well as completion codes for indicating the completion or non-completion of the operations specified in the unit machining schedule or schedules so that each of the supplied flat workpieces may be sequentially machined with predetermined machining procedures according to the machining schedule, wherein it comprises steps of assigning the unit machining schedule or schedules specified as non-completion by a completion code and conforming to a predetermined order, determining the presence or absence of a foreseeable schedule alarm condition that forces the operation of the sheet metal machining line to be suspended before or during the machining operation for the assigned unit machining schedule or schedules by analyzing the data items of the assigned unit machining schedule or schedules, determining skip or non-skip of the assigned unit machining schedule or schedules according the presence or absence of a skip mode arranged for the operation of the schedule or schedules if it is determined in the preceding step that a schedule alarm condition is foreseeable and updating the data items belonging to the unit machining schedule or schedules by adding data for skipping the unit machining schedule or schedules to the completion code of the assigned unit machining schedule or schedules if it is determined in the preceding step that a skip mode is arranged.

With the above arrangement, a processing operation of assigning the unit machining schedule or schedules specified as non-completion by a completion code and conforming to a predetermined order is firstly carried out. Then, it is determined if there is a foreseeable schedule alarm condition that forces the operation of the sheet metal machining line to be suspended before or during the machining operation for the assigned unit machining schedule or schedules by analyzing the data items of the assigned unit machining schedule or schedules. If there is a foreseeable schedule alarm condition, it is determined if the machining operation should skip the assigned unit machining schedule or schedules and go to the succeeding unit machining schedule or not according the presence or absence of a skip mode arranged for the operation of the schedule or schedules. Then, the data items belonging to the unit machining schedule or schedules are updated by adding data for skipping the unit machining a schedule or schedules to the completion code of the assigned unit machining schedule or schedules if it is determined in the preceding step that a skip mode is arranged.

Thus, any unfavorable situation that can force the operation of the line of manufacturing products of a specific item to be suspended for reasons such as no machining program in position, no available workpieces and/or a preparatory work to be done such as an exchange of metal molds that can arise before or during the machining operation for the products can be predicted by analyzing the unit machining schedule or schedules for the products assigned as conforming to a predetermined order. If there is a foreseeable schedule alarm condition, it is determined if the machining operation should skip the assigned unit machining schedule or schedules and go to the succeeding unit machining schedule or not according the presence or absence of a skip mode arranged for the operation of the schedule or schedules and, then, the data items belonging to the unit machining schedule or schedules are updated by adding data for skipping the unit machining schedule or schedules to the completion code of the assigned unit machining schedule or schedules if it is determined in the preceding step that a skip mode is arranged. Therefore, a machining operation involved in a unit machining schedule that can give rise to a schedule alarm condition can be automatically skipped so that the possible suspension of the operation of the sheet metal machining line can be minimized to improve the efficiency of the operation of the line if the operator is not constantly monitoring the line as in the case of the operation of the line during the night shift.

In still another aspect for achieving the above objects, the present invention provides a method of controlling a sheet metal machining line by using a machining schedule comprising one or more than one unit machining schedules arranged in the order of the machining operations to be carried out, if more than one unit machining schedules are used, and designed to be referred to for the objects to be machined and containing data items including the identification numbers of the machining programs involved, the number of workpieces to be machined and/or the presence or absence of preparatory work to be done as well as completion codes for indicating the completion or non-completion of the operations specified in the unit machining schedule or schedules so that each of the supplied flat workpieces may be sequentially machined with predetermined machining procedures according to the machining schedule, wherein it comprises steps of assigning the unit machining schedule or schedules specified as non-completion by a completion code and conforming to a predetermined order, determining the presence or absence of a foreseeable schedule alarm condition that forces the operation of the sheet metal machining line to be suspended before or during the machining operation for the assigned unit machining schedule or schedules by analyzing the data items of the assigned unit machining schedule or schedules, determining skip or non-skip of the assigned unit machining schedule or schedules according the presence or absence of a skip mode arranged for the operation of the schedule or schedules if it is determined in the preceding step that a schedule alarm condition is foreseeable, updating the data items belonging to the unit machining schedule or schedules by adding data for skipping the unit machining schedule or schedules to the completion code of the assigned unit machining schedule or schedules if it is determined in the preceding step that a skip mode is arranged, determining if all the machining operation of the unit machining schedule in question is over by referring to the completion code of the machining schedule and determining if a retry process for carrying out the skipped unit machining schedule or schedules once again or not according to the presence or absence of a retry mode arranged for the skipped unit machining schedule or schedules.

With the above arrangement, a processing operation of assigning the unit machining schedule or schedules specified as non-completion by a completion code and conforming to a predetermined order is firstly carried out. Then, it is determined if there is a foreseeable schedule alarm condition that forces the operation of the sheet metal machining line to be suspended before or during the machining operation for the assigned unit machining schedule or schedules by analyzing the data items of the assigned unit machining schedule or schedules. If there is a foreseeable schedule alarm condition, it is determined if the machining operation should skip the assigned unit machining schedule or schedules and go to the succeeding unit machining schedule or not according the presence or absence of a skip mode arranged for the operation of the schedule or schedules. Then, the data items belonging to the unit machining schedule or schedules are updated by adding data for skipping the unit machining schedule or schedules to the completion code of the assigned unit machining schedule or schedules if it is determined in the preceding step that a skip mode is arranged. Thereafter, it is determined if all the machining operation of the unit machining schedule in question is over by referring to the completion code of the machining schedule and then if a retry process for carrying out the skipped unit machining schedule or schedules once again or not according to the presence or absence of a retry mode arranged for the skipped unit machining schedule or schedules.

Thus, any unfavorable situation that can force the operation of the line of manufacturing products of a specific item to be suspended for reasons such as no machining program in position, no available workpieces and/or a preparatory work to be done such as an exchange of metal molds that can arise before or during the machining operation for the products can be predicted by analyzing the unit machining schedule or schedules for the products assigned as conforming to a predetermined order. If there is a foreseeable schedule alarm condition, it is determined if the machining operation should skip the assigned unit machining schedule or schedules and go to the succeeding unit machining schedule or not according the presence or absence of a skip mode arranged for the operation of the schedule or schedules and, then, the data items belonging to the unit machining schedule or schedules are updated by adding data for skipping the unit machining schedule or schedules to the completion code of the assigned unit machining schedule or schedules if it is determined in the preceding step that a skip mode is arranged.

Thereafter, it is determined if all the machining operation of the unit machining schedule in question is over or not by referring to the completion code of the machining schedule and then if a retry process for realizing the skipped unit machining schedule or schedules should be carrier out once again or not according to the presence or absence of a retry mode arranged for the skipped unit machining schedule or schedules. Therefore, a skipped machining operation involved in a unit machining schedule can be carried out once again after all the machining operation of the unit machining schedule is over so that the possible suspension of the operation of the sheet metal machining line can be minimized to improve the efficiency of the operation of the line if the operator is not constantly monitoring the line as in the case of the operation of the line during the night shift.

In still another aspect for achieving the above objects, the present invention provides an apparatus for controlling a sheet metal machining line by using a machining schedule comprising one or more than one unit machining schedules arranged in the order of the machining operations to be carried out, if more than one unit machining schedules are used, and designed to be referred to for the objects to be machined and containing data items including the identification numbers of the machining programs involved, the number of workpieces to be machined and/or the presence or absence of preparatory work to be done as well as completion codes for indicating the completion or non-completion of the operations specified in the unit machining schedule or schedules so that each of the supplied flat workpieces may be sequentially machined with predetermined machining procedures according to the machining schedule, wherein it comprises an assigning means for assigning the unit machining schedule or schedules specified as non-completion by a completion code and conforming to a predetermined order, an alarm condition determining means for determining the presence or absence of a foreseeable schedule alarm condition that forces the operation of the sheet metal machining line to be suspended before or during the machining operation for the assigned unit machining schedule or schedules by analyzing the data items of the assigned unit machining schedule or schedules and an alarm condition notifying means for notifying the operator of the presence of a foreseeable schedule alarm condition if it is so determined in the preceding step.

With the above arrangement, the assigning mean firstly carries out a processing operation of assigning the unit machining schedule or schedules specified as non-completion by a completion code and conforming to a predetermined order. Then, the alarm condition determining means determines if there is a foreseeable schedule alarm condition that forces the operation of the sheet metal machining line to be suspended before or during the machining operation for the assigned unit machining schedule or schedules by analyzing the data items of the assigned unit machining schedule or schedules. The alarm condition notifying means notifies the operator of the presence of a foreseeable schedule alarm condition if it is so determined in the preceding step.

Thus, any unfavorable situation that can force the operation of the line of manufacturing products of a specific item to be suspended for reasons such as no machining program in position, no available workpieces and/or a preparatory work to be done such as an exchange of metal molds that can arise before or during the machining operation for the products can be predicted by analyzing the unit machining schedule or schedules for the products assigned as conforming to a predetermined order and the operator is notified of the foreseeable unfavorable situation so that the operator can be prepared for a possible suspension of the operation of the line before the machining operation for the products.

In a preferred embodiment, the operator is notified of a schedule alarm condition and the cause thereof if it is determined that such a schedule alarm condition is foreseeable.

With this preferred embodiment, the operator is notified of a schedule alarm condition and the cause thereof if it is determined that such a schedule alarm condition is foreseeable. Then, the operator can quickly respond to such a situation because he or she is aware of the predicted possible schedule alarm condition well before the start of the operation of machining workpieces for the products in question.

In still another aspect for achieving the above objects, the present invention provides an apparatus for controlling a sheet metal machining line by using a machining schedule comprising one or more than one unit machining schedules arranged in the order of the machining operations to be carried out, if more than one unit machining schedules are used, and designed to be referred to for the objects to be machined and containing data items including the identification numbers of the machining programs involved, the number of workpieces to be machined and/or the presence or absence of preparatory work to be done as well as completion codes for indicating the completion or non-completion of the operations specified in the unit machining schedule or schedules so that each of the supplied flat workpieces may be sequentially machined with predetermined machining procedures according to the machining schedule, wherein it comprises an assigning means for assigning the unit machining schedule or schedules specified as non-completion by a completion code and conforming to a predetermined order, an alarm condition determining means for determining the presence or absence of a foreseeable schedule alarm condition that forces the operation of the sheet metal machining line to be suspended before or during the machining operation for the assigned unit machining schedule or schedules by analyzing the data items of the assigned unit machining schedule or schedules, a skip mode determining means for determining skip or non-skip of the assigned unit machining schedule or schedules according the presence or absence of a skip mode arranged for the operation of the schedule or schedules if it is determined in the preceding step that a schedule alarm condition is foreseeable and a data updating means for updating the data items belonging to the unit machining schedule or schedules by adding data for skipping the unit machining schedule or schedules to the completion code of the assigned unit machining schedule or schedules if it is determined in the preceding step that a skip mode is arranged.

With the above arrangement, the assigning mean firstly carries out a processing operation of assigning the unit machining schedule or schedules specified as non-completion by a completion code and conforming to a predetermined order. Then, the alarm condition determining means determines if there is a foreseeable schedule alarm condition that forces the operation of the sheet metal machining line to be suspended before or during the machining operation for the assigned unit machining schedule or schedules by analyzing the data items of the assigned unit machining schedule or schedules. If there is a foreseeable schedule alarm condition, the skip mode determining means determines if the machining operation should skip the assigned unit machining schedule or schedules and go to the succeeding unit machining schedule or not according the presence or absence of a skip mode arranged for the operation of the schedule or schedules. Then, the data updating means update the data items belonging to the unit machining schedule or schedules by adding data for skipping the unit machining schedule or schedules to the completion code of the assigned unit machining schedule or schedules if it is determined in the preceding step that a skip mode is arranged.

Thus, any unfavorable situation that can force the operation of the line of manufacturing products of a specific item to be suspended for reasons such as no machining program in position, no available workpieces and/or a preparatory work to be done such as an exchange of metal molds that can arise before or during the machining operation for the products can be predicted by analyzing the unit machining schedule or schedules for the products assigned as conforming to a predetermined order. If there is a foreseeable schedule alarm condition, it is determined if the machining operation should skip the assigned unit machining schedule or schedules and go to the succeeding unit machining schedule or not according the presence or absence of a skip mode arranged for the operation of the schedule or schedules and, then, the data items belonging to the unit machining schedule or schedules are updated by adding data for skipping the unit machining schedule or schedules to the completion code of the assigned unit machining schedule or schedules if it is determined in the preceding step that a skip mode is arranged. Therefore, a machining operation involved in a unit machining schedule that can give rise to a schedule alarm condition can be automatically skipped so that the possible suspension of the operation of the sheet metal machining line can be minimized to improve the efficiency of the operation of the line if the operator is not constantly monitoring the line as in the case of the operation of the line during the night shift.

In a further aspect for achieving the above objects, the present invention provides an apparatus for controlling a sheet metal machining line by using a machining schedule comprising one or more than one unit machining schedules arranged in the order of the machining operations to be carried out, if more than one unit machining schedules are used, and designed to be referred to for the objects to be machined and containing data items including the identification numbers of the machining programs involved, the number of workpieces to be machined and/or the presence or absence of preparatory work to be done as well as completion codes for indicating the completion or non-completion of the operations specified in the unit machining schedule or schedules so that each of the supplied flat workpieces may be sequentially machined with predetermined machining procedures according to the machining schedule, wherein it comprises an assigning means for assigning the unit machining schedule or schedules specified as non-completion by a completion code and conforming to a predetermined order, an alarm condition determining means for determining the presence or absence of a foreseeable schedule alarm condition that forces the operation of the sheet metal machining line to be suspended before or during the machining operation for the assigned unit machining schedule or schedules by analyzing the data items of the assigned unit machining schedule or schedules, a skip mode determining means for determining skip or non-skip of the assigned unit machining schedule or schedules according the presence or absence of a skip mode arranged for the operation of the schedule or schedules if it is determined in the preceding step that a schedule alarm condition is foreseeable, a data updating means for updating the data items belonging to the unit machining schedule or schedules by adding data for skipping the unit machining schedule or schedules to the completion code of the assigned unit machining schedule or schedules if it is determined in the preceding step that a skip mode is arranged, a completion determining means for determining if all the machining operation of the unit machining schedule in question is over by referring to the completion code of the machining schedule and a retry process determining means for determining if a retry process for carrying out the skipped unit machining schedule or schedules once again or not according to the presence or absence of a retry mode arranged for the skipped unit machining schedule or schedules.

With the above arrangement, the assigning mean firstly carries out a processing operation of assigning the unit machining schedule or schedules specified as non-completion by a completion code and conforming to a predetermined order. Then, the alarm condition determining means determines if there is a foreseeable schedule alarm condition that forces the operation of the sheet metal machining line to be suspended before or during the machining operation for the assigned unit machining schedule or schedules by analyzing the data items of the assigned unit machining schedule or schedules. If there is a foreseeable schedule alarm condition, the skip mode determining means determines if the machining operation should skip the assigned unit machining schedule or schedules and go to the succeeding unit machining schedule or not according the presence or absence of a skip mode arranged for the operation of the schedule or schedules. Then, the data updating means update the data items belonging to the unit machining schedule or schedules by adding data for skipping the unit machining schedule or schedules to the completion code of the assigned unit machining schedule or schedules if it is determined in the preceding step that a skip mode is arranged. Thereafter, the completion determining means determines if all the machining operation of the unit machining schedule in question is over by referring to the completion code of the machining schedule and then the retry process determining means determines if a retry process for carrying out the skipped unit machining schedule or schedules once again or not according to the presence or absence of a retry mode arranged for the skipped unit machining schedule or schedules.

Thus, any unfavorable situation that can force the operation of the line of manufacturing products of a specific item to be suspended for reasons such as no machining program in position, no available workpieces and/or a preparatory work to be done such as an exchange of metal molds that can arise before or during the machining operation for the products can be predicted by analyzing the unit machining schedule or schedules for the products assigned as conforming to a predetermined order. If there is a foreseeable schedule alarm condition, it is determined if the machining operation should skip the assigned unit machining schedule or schedules and go to the succeeding unit machining schedule or not according the presence or absence of a skip mode arranged for the operation of the schedule or schedules and, then, the data items belonging to the unit machining schedule or schedules are updated by adding data for skipping the unit machining schedule or schedules to the completion code of the assigned unit machining schedule or schedules if it is determined in the preceding step that a skip mode is arranged. Thereafter, it is determined if all the machining operation of the unit machining schedule in question is over or not by referring to the completion code of the machining schedule and then if a retry process for realizing the skipped unit machining schedule or schedules should be carrier out once again or not according to the presence or absence of a retry mode arranged for the skipped unit machining schedule or schedules. Therefore, a skipped machining operation involved in a unit machining schedule can be carried out once again after all the machining operation of the unit machining schedule is over so that the possible suspension of the operation of the sheet metal machining line can be minimized to improve the efficiency of the operation of the line if the operator is not constantly monitoring the line as in the case of the operation of the line during the night shift.

The nature, principle and utility of the invention will become more apparent from the following detailed description when read in conjunction with the accompanying drawings.

DESCRIPTION OF THE PREFERRED EMBODIMENTS

Now, the present invention will be described in greater detail by referring to the accompanying drawings that illustrate preferred embodiments of method and apparatus for controlling a sheet metal machining line according to the invention.

Figure 1:
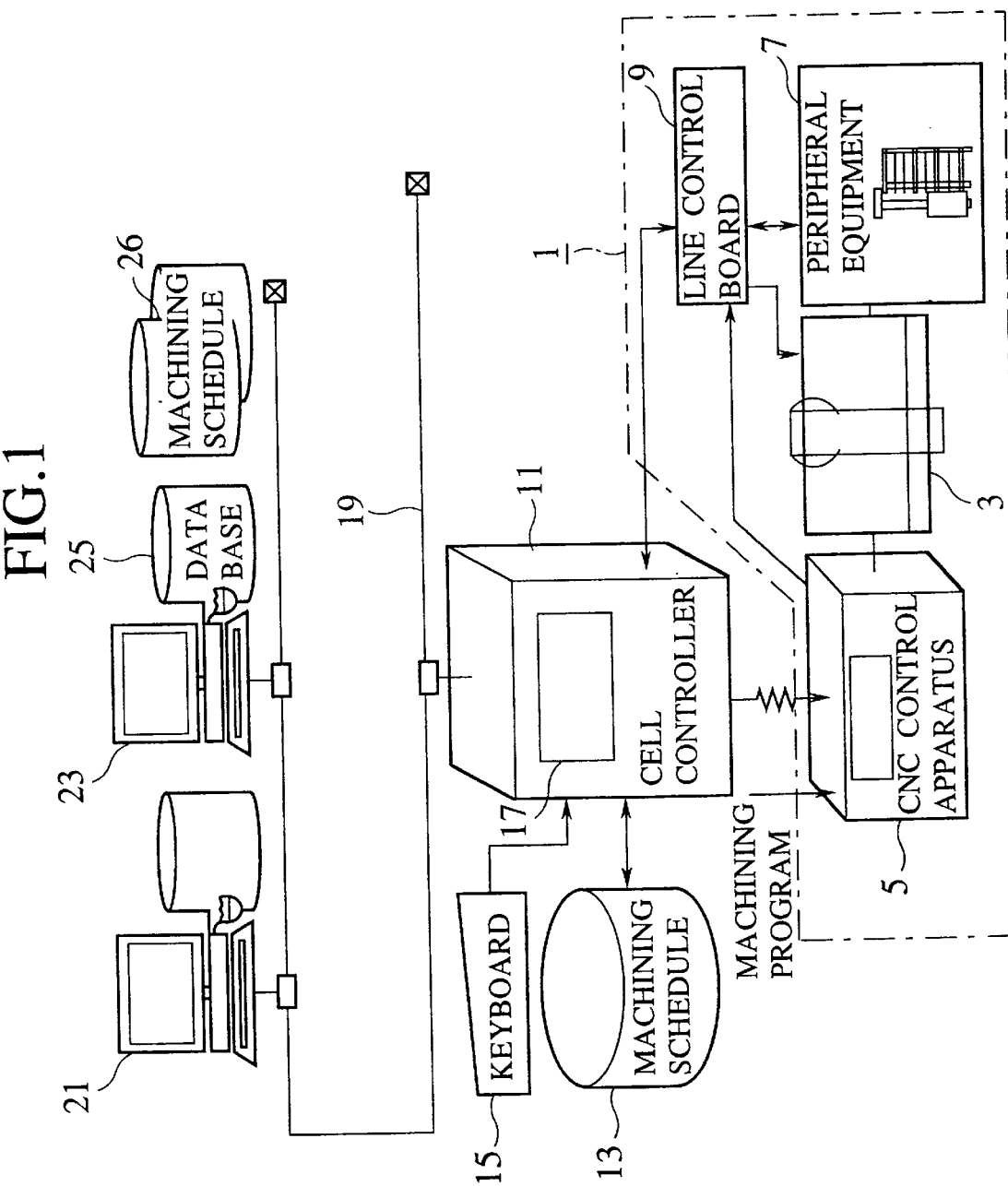
FIG. 1 is a block diagram of a sheet metal machining line to be operated under the control of a method according to the invention.
Figure 2:
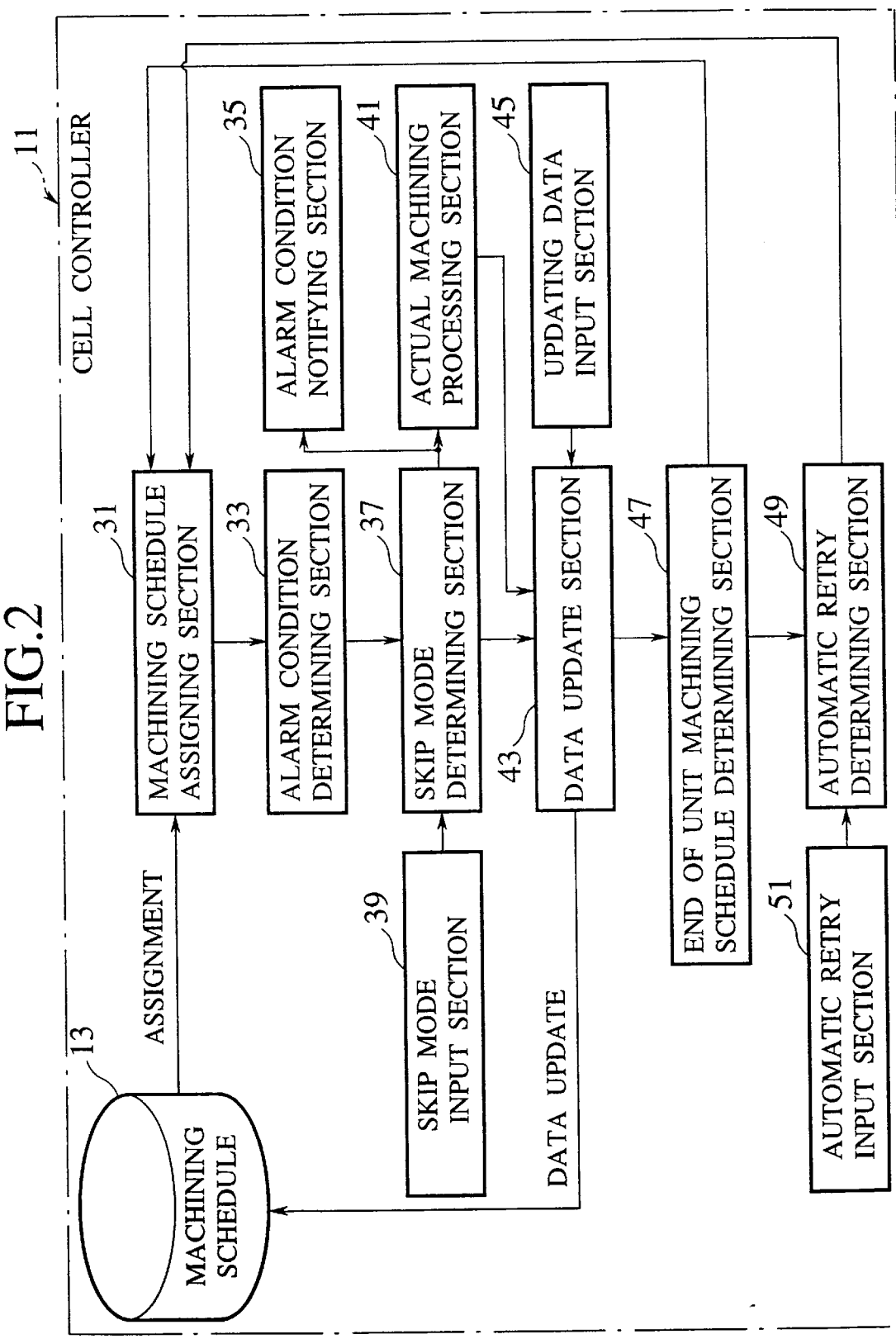
FIG. 2 is a schematic block diagram of an embodiment of apparatus for controlling a sheet metal machining line according to the invention.
Figure 3:
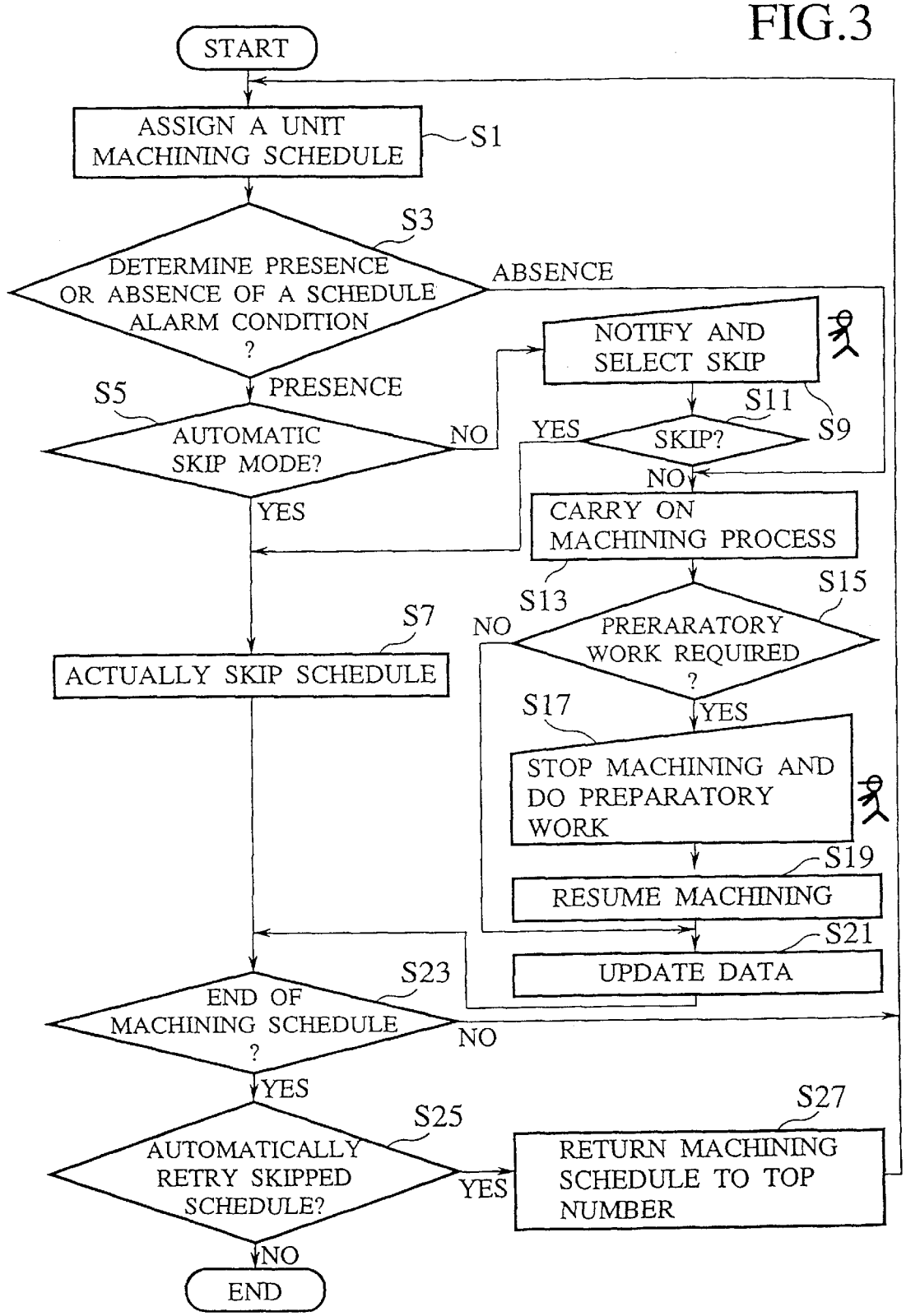
FIG. 3 is a flow chart illustrating the operation of controlling a sheet metal machining line by a method according to the invention.
Figure 4:
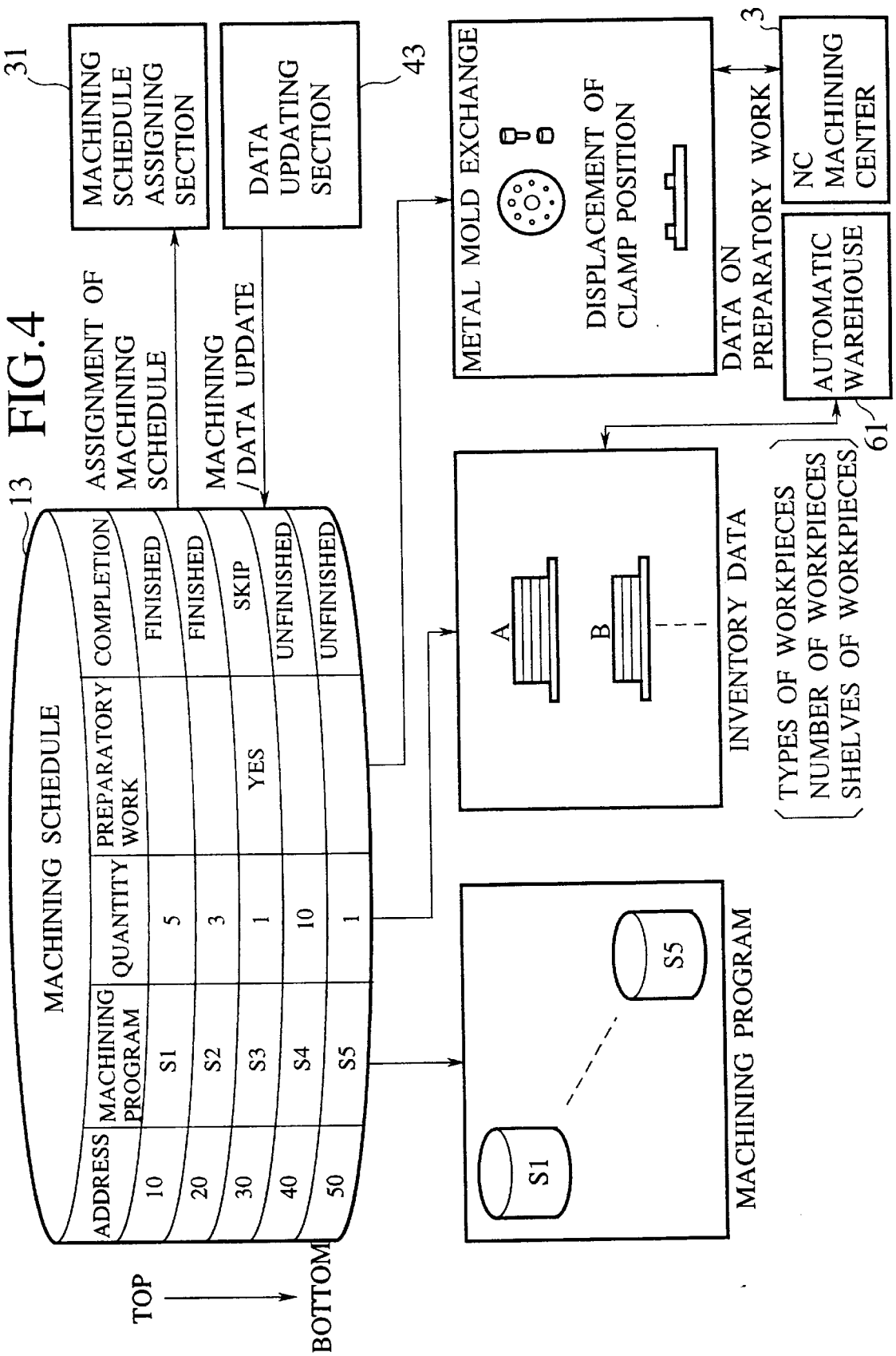
FIG. 4 is a schematic illustration of a machining schedule that can be used for the purpose of the invention.
Figure 5:
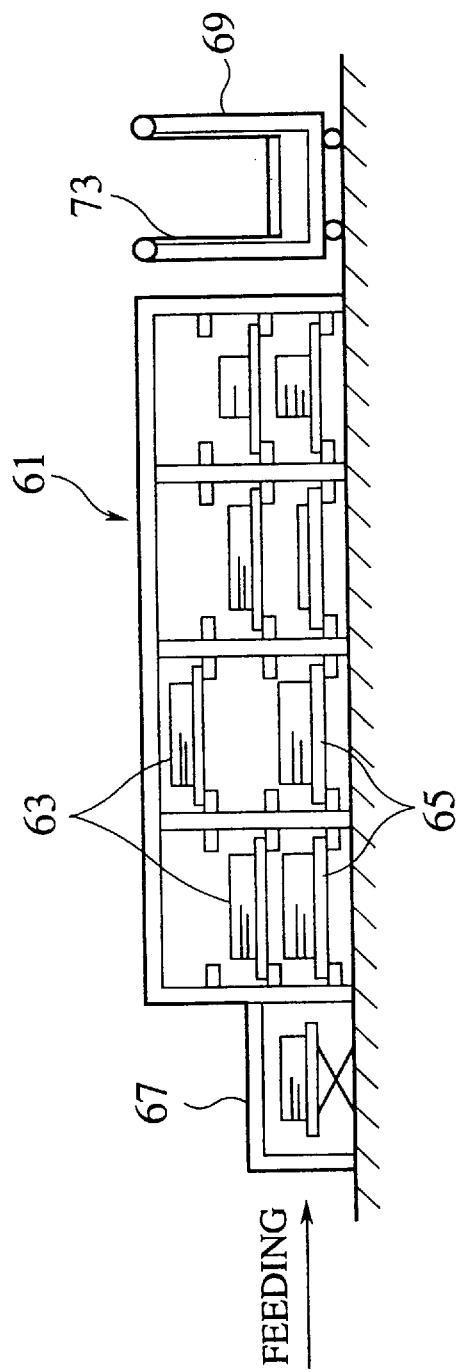
FIG. 5 is a schematic lateral view of the peripheral equipment of a sheet metal machining line that can be used for the purpose of the invention.
Figure 6:
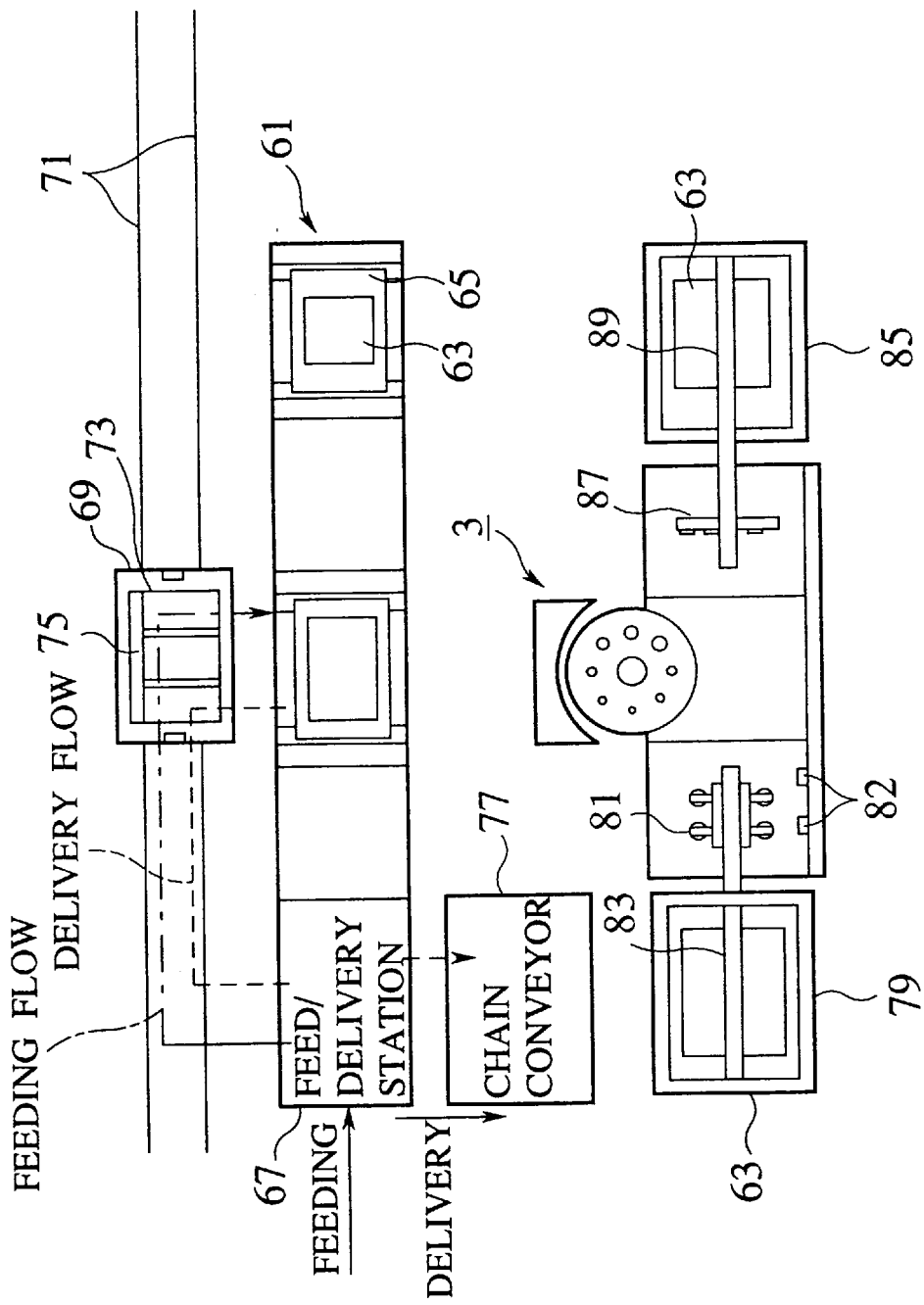
FIG. 6 is a schematic plan view of the peripheral equipment of the sheet metal machining line of FIG. 5.
Figure 7:
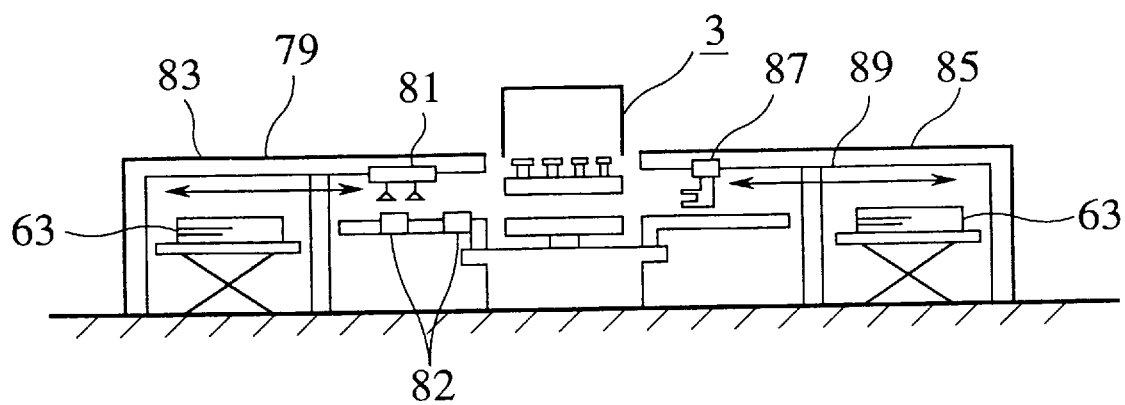
FIG. 7 is another schematic lateral view of the peripheral equipment of a sheet metal machining line of FIG. 5.

FIG. 1 is a block diagram of a sheet metal machining line to be operated under the control of a method according to the invention and FIG. 2 is a schematic block diagram of an embodiment of apparatus for controlling a sheet metal machining line according to the invention, whereas FIG. 3 is a flow chart illustrating the operation of controlling a sheet metal machining line by a method according to the invention and FIG. 4 is a schematic illustration of a machining schedule that can be used for the purpose of the invention. FIGS. 5 through 7 are a schematic views of the peripheral equipment of a sheet metal machining line that can be used for the purpose of the invention.

Firstly, a sheet metal machining line provided with peripheral equipment and controlled by a method according to the invention will be described by referring to FIG. 1. As seen from FIG. 1, the sheet metal machining line 1 comprises an NC machining center 3 that typically includes a turret punch press for punching holes through sheet metals by selectively using a plurality of different metal molds, a CNC control apparatus 5 for controlling the operation of the NC machining center 3 according to a machining program, a workpiece holding/releasing unit for holding and releasing workpieces to be machined by the NC machining center 3, an automatic warehouse for storing a number of workpieces in groups according to the materials and the dimensions of the workpieces, peripheral equipment 7 including one or more than one crane vehicles for moving workpieces from the automatic warehouse to the workpiece holding/releasing unit and a line control board 9 connected to the NC machining center 3, the CNC control apparatus 5 and the peripheral equipment 7 for controlling the sequence of operations of the sheet metal machining line 1. Additionally, the sheet metal machining line 1 is connected to a cell controller 11 for transferring machining programs to the CNC control apparatus 5 and also transferring ladder-sequence programs to the line control board 9 in order to control the entire operation of the sheet metal machining line 1 in a coordinated manner.

The cell controller 11 is provided with a memory device having a predetermined capacity, e.g., 1 GB, typically for storing machining schedules 13 prepared according to a given production plan and referred to in the course of manufacturing products according to the production plan. The cell controller 11 is additionally provided with a keyboard 15 for entering character and numerical data and a display unit 17 for displaying an alarm condition on the display screen when an alarm condition that forces the sheet metal machining line 1 to suspend its operation occurs.

The cell controller 11 is connected to a local area network (hereinafter referred to as LAN) 19 such as Ethernet. The LAN 19 is by turn connected to an automatic programming apparatus 21 for automatic preparation of machining programs necessary for manufacturing specific products including CAD data on the sequence of machining operations, the machining conditions and the tools to be used for machining in order to produce the products and a parent server 23 for controlling various data and programs in a coordinated manner including the machining programs prepared by the automatic programming apparatus 21, CAD data on different products and data on machining schedules, said parent server 23 being additionally capable of transferring machining schedules to the cell controller 11. Then, the parent server 23 is connected to a data base 25 for storing machining programs, CAD data on different products and data on machining schedules according to given data base formats and so configured that, when the machining schedules 13 are, if partly, updated manually or automatically through the cell controller 11 operating as an on-site terminal, the data base 25 is accordingly updated by way of the LAN 19 in order to keep the data base 25 always current.

The peripheral equipment 7 connected to the sheet metal machining line 1 will now be described by referring to FIGS. 5 through 7. The sheet metal machining line 1 is provided with an automatic warehouse 61 operating as a buffer in the course of supplying the NC machining center 3 with a required number of rough workpieces of desired materials and dimensions on a just in-time basis. The automatic warehouse 61 sorts out workpieces brought in by pallets 65 according to their materials and dimensions in such a way that workpieces of a same group to be machined and delivered simultaneously can be stored on a same shelf. Additionally, the automatic warehouse 61 is provided with a stacker-crane 69 for feeding workpieces onto shelves and delivering workpieces from shelves and a feed/delivery station 67 for temporarily storing workpieces before they are stored in the automatic warehouse 61 or moved out of the automatic warehouse 61 by means of the stacker-crane 69.

The stacker-crane 69 is designed to move on a pair of parallel rails 71 laid along the longitudinal direction of the automatic warehouse 61 in a self-controlled manner. It carries thereon a lift 73 and a traverser 75 for moving a pallet 65 loaded with workpieces 63 from a shelf of the automatic warehouse 61 or from the crane 69 to an available vacant shelf in the automatic warehouse 61 so that the workpieces 63 newly supplied to the feed/delivery station 67 can be transferred to available vacant shelves in the automatic warehouse 61 for storage and desired workpieces 63 can be moved from the shelves storing them in the automatic warehouse 61 to the feed/delivery station 67.

The number of workpieces in the automatic warehouse 61 is manually inputted by an operator or automatically detected by a CCD camera provided in the automatic warehouse 61. Specifically, when a workpiece bundle first enters the automatic warehouse 61, the side of the bundle is photographed by a CCD camera to detect the number of workpieces. When a pallet is transferred to, for example, a take-one station 79 for machining, it is determined which pallet is transferred by detecting the movement of the crane 69. When a workpiece is transferred from the take-one station 79 to NC turret punch press (in NC machining center 3), it is then determined how many workpieces are used by counting the number of operations performed by a vacuum head 81, and updating the remaining number of workpieces in the automatic warehouse 61.

A chain conveyor 77 is arranged adjacent to the feed/delivery station 67 to supply the NC machining center 3 with workpieces 63 from the feed/delivery station 67. Workpieces 63 are moved from the feed/delivery station 67 firstly to the take-one station 79 located next to the chain conveyor 77 by the chain conveyor 77. The take-one station 79 is provided in an upper area thereof with a take-one station side rail 83 extending toward the NC machining center 3 and a vacuum head 81 movable horizontally and vertically along the rail 83 and designed to pick up the uppermost workpiece 63 on the pallet 65 for delivery. Thus, the workpieces 63 on the pallet 65 are delivered to the NC machining center 3 on a one-by-one basis by means of a vacuum head 81. Each workpiece 63 fed to the NC machining center 3 is then held by a workpiece clamp 83 arranged on the NC machining center 3 and placed in position so that the workpiece 63 may be machined according to a program.

A collecting station 85 is arranged for collecting machined workpieces 63 from the NC machining center 3 on the side of the NC machining center 3 opposite to the feed/delivery station 67. It is provided in an upper area thereof with a collecting station side rail 89 extending from the NC machining center 3 and a clamp unit 87 movable horizontally and vertically along the rail 89 and designed to clamp and move the machined workpiece 63 away from the NC machining center 3. Thus, each workpiece 63 machined by the NC machining center 3 is then moved to the collecting station 85 for temporary storage.

The machining schedule 13 will now be described in greater detail. As shown in FIG. 4, the machining schedule 13 is referred to when workpieces are sequentially machined to produce products of different types. Additionally, it is designed to rearrange a plurality of data items incidentally generated in the course of machining operations in columns as record units for different products, which records units are then arranged in rows according to the machining sequence. The files in the machining schedule 13 are arranged in database formats. For the purpose of the present invention, a unit record will be referred to a unit machining schedule hereinafter. Data items are differentiated according to different schedules and include address numbers to be assigned on a first-in first-out basis, machining program identification numbers to be assigned in correspondence to address numbers, the number of workpieces or absence of a specific operational arrangement and completion codes. The presence or absence of a specific operational arrangement comes into the scene for replacing metal molds and aligning workpieces. Data will be described on the presence or absence of a specific operational arrangement for shifting the position of the workpiece clamp unit. Completion codes will be used for describing data representing the completion or incompleteness of the machining operation for a unit machining schedule or a machining operation to be skipped.

The procedures for reading desired data from a machining schedule 13 having a configuration as described above will now be described by referring to FIG. 4 and assuming that the machining program belonging to the unit machining schedule with address number "10" is to be read out. The machining program belonging to the unit machining schedule with address number "10" has an identification number of "S1" as shown in FIG. 4 so that the cell controller 11 detects the identification number of "S1" to retrieve and read out the machining program from the machining program file storing a plurality of machining programs with respective program identification numbers.

The cell controller 11 issues commands for operation according to the machining schedule 13 by referring to the latter having a configuration as described above. The issued operational commands are then sent to the CNC control apparatus 5 along with the corresponding machining programs and also to the line control board 9. Upon receiving the commands, the sheet metal machining line 1 sequentially carries out the specified machining operations including cutting, drilling and bending on the delivered flat workpieces. On the other hand, the cell controller 11 analyzes a plurality of data items listed on the unit machining schedule for the workpieces to be machined before issuing the operational commands in order to see if an alarm condition is expected to take place to force the operation of the sheet metal machining line 1 to be suspended during or before the machining operations for the unit machining schedule. Specifically, the cell controller 11 foresees an alarm condition that is expected to occur when the identification number of a machining program or each of the machining programs to be used for machining given workpieces is not stored in the corresponding unit machining schedule, that is, the machining program or machining programs for the workpieces are not found in the unit machining schedule, when the number of stored workpieces falls under the required number and when a preparatory work has to be done manually for exchanging metal molds, moving the work clamps and/or some other operation. The mounted metal molds and clamps are identified by bar codes and/or sensors. When the attaching location of the clamp to a carriage is changed, the carriage is moved by a motor and a ball screw. Therefore it is determined where the clamp is attached to the carriage by detecting the movement of the carriage by means of an encoder of the carriage motor. The data related to the clamps and the mounted metal molds are stored in the database 25.

The operation of detecting possible alarm conditions is carried out by comparing each of the machining programs in the assigned unit machining schedule and with the stored machining program files, comparing the workpiece inventory data of the automatic warehouse 61 with the required number of workpieces indicated in the machining schedule, and evaluating the data concerning the metal molds mounted on the NC machining center 3 and the locations of claims in the NC machining center 3 to determine if preparatory work is required. If an alarm condition is expected to occur, the cell controller 11 notifies the operator of the condition by displaying the expected alarm condition and the cause of the alarm condition on the display screen of the display unit 17. Thus, the cell controller 11 tells the operator if a situation that forces the operation of the sheet metal machining line 1 to be suspended is foreseeable or not before or during the machining operation.

The internal configuration of the cell controller 11 will be described by referring to the block diagram of FIG. 2. As shown in FIG. 2, the cell controller 11 comprises a machining schedule assigning section 31 for assigning a unit machining schedule having a completion code representing "unprocessed" or "skip" for analysis by referring to the machining schedule 13, an alarm condition determining section 33 for determining the presence or absence of a foreseeable alarm condition by analyzing the data items of the unit machining schedule assigned by the machining schedule assigning section 31, a skip mode input section 39 for entering a command for setting up a skip mode for skipping the unit machining schedule involving a foreseeable alarm condition detected by the alarm condition determining section 33 to the next schedule, a skip mode determining section 37 for determining the selection or non-selection of a skip mode for skipping to the next schedule according to the command input for a skip mode and depending on the determination of the alarm condition determining section 33, an alarm condition occurrence notifying section 35 for notifying the operator of the foreseeable alarm condition and the cause of the alarm condition in response to the determination by the skip mode determining section 37 of not skipping the unit machining schedule involving the foreseeable alarm condition, an actual machining processing section 41 for issuing a command for carrying on the predetermined machining process in response to the determination by the skip mode determining section 37 of skipping the unit machining schedule involving the foreseeable alarm condition or the absence of an alarm condition, an updating data input section 45 for manually or automatically entering updating data in response to the need for updating the contents of specified data items in the machining schedule 13 such as the inventory data due to the newly supplied workpieces 63 of a given type, a data updating section 43 for actually updating the contents of the specified data items in response to the input of the updating data input section 45 as well as for updating the remark of "skip" in the completion code column of the unit machining schedule in response to the determination by the skip mode determining section 37 of selecting a skip mode and for updating the remark of "completion" in the completion code column of the unit machining schedule in response to the acknowledgment by the actual machining processing section 41 of the completion of the predetermined machining process, an end of unit machining schedule determining section 47 for determining the end of all the unit machining schedule by referring to the completion code column, an automatic retry input section 51 for automatically entering a command for setting up an automatic retry mode of automatically carrying out a retry process starting from the leading address number to the skipped unit machining schedule if a unit machining schedule has been skipped or the last one of the skipped unit machining schedules if more than one unit machining schedules has been skipped and an automatic retry determining section 49 for determining the execution of the retry process according to the input of the automatic retry input section 51 for selection or non-selection of an automatic retry mode.

Now, the operation of an apparatus for controlling the operation of a sheet metal machining line according to the invention will be described by referring to the flow chart of FIG. 3 along with FIGS. 1, 2 and 4.

Firstly, the machining schedule assigning section 31 assigns the unit machining schedule with the smallest address number out of the one or more than one unit machining schedules with a remark of "unprocessed" in the completion code column by referring to the machining schedule 13 (Step S1). If the retry process of Step S25 that will be described hereinafter is carried out in Step S1, the machining schedule assigning section 31 assigns the unit machining schedule with the smallest address number out of the one or more than one unit machining schedules with a remark of "skip" in the completion code column.

After the assigning operation in Step S1, the alarm condition determining section 33 analyzes the data items of the unit machining schedule assigned by the machining schedule assigning section 31 and determines the presence or absence of a foreseeable schedule alarm condition on the basis of the analysis (Step S3). Note that the analysis in Step S3 is conducted from the viewpoint of seeing if there is a foreseeable situation that forces the operation of the sheet metal machining line 1 to be suspended during the process of machining workpieces according to the unit machining schedule in question. More specifically, the alarm condition determining section 33 checks by analysis if the identification number of the machining program for machining workpieces to produce given products is found in the unit machining schedule in question or there is the machining program for the given products, if the inventory has a sufficient number of workpieces for machining and if a manual preparatory work is required for exchanging metal molds, moving the work clamps and/or some other operation by referring to the machining program file, the workpiece inventory data and the metal mold data and determines that there is a foreseeable alarm condition if at least one of the situations that the machining program is missing for the products, that the inventory does not have a sufficient number of workpieces for machining and that a manual preparatory work is required is expected to take place.

If it is determined that there is a foreseeable schedule alarm condition as a result of the analysis in Step S3, the skip mode determining section 37 carries out a processing operation of determining the selection or non-selection of a skip mode for skipping to the next schedule according to the command input for a skip mode by the skip mode input section 39 (Step S5). Note that the keyboard 15 affixed to the cell controller 11 may be used for the skip mode determining section 37.

If it is determined as a result of the skip mode determining process in Step S5 that a skip mode is set, the data updating section 43 actually updates the remark of "skip" in the completion code column of the unit machining schedule in question (Step S7). Note that the process of determining a skip mode in Step S5 and that of data updating in Step S7 can be omitted if appropriate.

If, to the contrary, it is determined as a result of the skip mode determining process in Step S5 that a skip mode is not set, the alarm condition occurrence notifying section 35 notifies the operator of the foreseeable alarm condition and the cause of the alarm condition by way of the display unit 17 and, at the same time, prompts the operator to enter the selection or non-selection of a skip mode for another time also by way of the display unit (Step S9). The reason for prompting the operator to enter the selection or non-selection of a skip mode for another time is to allow the operator to flexibly operate the sheet metal machining line 1 by adequately responding to the circumstances particularly when the cause of the alarm condition can be removed by carrying out few preparatory steps or when the time limit for delivering the products according to the unit machining schedule in question and, therefore, the unit machining schedule should be given priority at the cost of cumbersome preparatory work required to be repeated each time the operation of the line is suspended.

If the operation of determining the selection or non-selection of a skip mode of Step S5 is omitted, the alarm condition occurrence notifying section 35 may be so arranged that it notifies the operator of the foreseeable alarm condition and the cause of the alarm condition by way of the display unit 17 if it is determined that there is a foreseeable schedule alarm condition as a result of the analysis in Step S3.

After the notification of the expected occurrence of an alarm condition and the operation of prompting the selection and input of a skip mode in Step S9, the skip mode determining section 37 repeat the processing operation of determining the selection or non-selection of a skip mode for skipping to the next schedule according to the command input for a skip mode by the skip mode input section 39 (Step S11).

If, on the other hand, it is determined as a result of the skip mode determining process in Step S11 that a skip mode is not set or it is determined by the alarm condition determining section 33 that there is no foreseeable occurrence of an alarm condition, the actual machining processing section 41 issues a command for carrying on the predetermined machining process according to the unit machining schedule in question (Step S13). Along with the issuance of a command for carrying on the predetermined machining process in Step S13, the actual machining processing section 41 watches the process to detect the occurrence of a situation that requires a preparatory work for exchanging metal molds or supplying additional workpieces 63 (Step S15).

If the occurrence of a situation requiring a preparatory work is detected in Step S15, the actual machining processing section 41 suspends the operation of the NC machining center 3 until the operator finishes the preparatory work and holds it in a stand-by state (Step S17). When the operator finishes the preparatory work and the data concerning the preparatory work including the scheduled supply of workpieces 63 and the type of the metal mold after the metal mold exchanging operation are updated manually or automatically by way of the updating data input section 45, the actual machining processing section 41 issues a command for resuming the machining operation to the NC machining center 3, which resumes the machining operation (Step S19). If another preparatory work is required after the resume of the machining operation in Step S19, the Steps S17 through 19 will be repeated.

After the resumption of the machining operation in Step S19, the data updating section 43 puts "completion" into the completion code column of the current unit machining schedule and updates the workpiece inventory data file keeping the number of workpieces 63 of different types and the metal mold data including the data on the type of the current metal mold if the preparatory work involves an operation of exchanging the metal mold (Step S21). If the metal molds belonging to the NC machining center 3 are provided with respective identifiers such as bar codes, the metal mold data can be updated without requiring the operation of manually entering the type of the metal mold after the exchanging operation.

After the data updating operation in Step S7 or S21, the end of unit machining schedule determining section 47 determines if all the machining operation of the unit machining schedule is over or not by referring to the completion code column of the machining schedule 13 (Step S23). If it is determined in Step S23 that the machining operation of the unit machining schedule is not finished, the processing operation goes back to Step S1 to follow the same steps.

If, on the other hand, it is determined in Step S23 that the machining operation of the unit machining schedule is finished, the automatic retry determining section 49 determines if the retry process of automatically carrying out the skipped unit machining schedule or schedules from the one having the smallest address number should be selected or not according to the input of the automatic retry input section 51 (Step S25).

If it is determined in Step S25 that the retry process of automatically carrying out the skipped unit machining schedule or schedules, the automatic retry determining section 49 brings back the machining schedule 13 to the leading address (Step S27) and returns the machining operation to Step S1 to follow the same steps.

If, on the other hand, it is determined in Step S25 that the retry process of automatically carrying out the skipped unit machining schedule or schedules, the automatic retry determining section 49 assumes that all the unit machining schedules are finished and terminates the entire operation.

As described above, a control apparatus for controlling a sheet metal machining line according to the invention controls the sheet metal machining line to foresee an unfavorable situation that can force the operation of the line of manufacturing products of a specific item to be suspended for reasons such as no available workpieces and/or a preparatory work to be done such as an exchange of metal molds that can arise before or during the machining operation for the products by analyzing the unit machining schedule for the products including the data items described in the schedule such as the identification numbers of the machining programs involved, the use or non-use of such identification numbers, the number of workpieces to be machined and the presence or absence of the predetermined procedures for exchanging metal molds to be referred to for manufacturing the products, informing the operator of the foreseen situation or the non-existence of such a foreseen unfavorable situation in order to make the operator prepared for a possible suspension of the operation of the line. Thus, the operator can see any possible schedule alarm condition and the cause thereof before the operation of machining the workpieces in question and, therefore, make him- or herself ready for the expected suspension of the operation of the sheet metal machining line.

Then, if it is determined that there is a foreseeable schedule alarm condition and the unit machining schedule in question is set in a skip mode, the data items belonging to the unit machining schedule are updated to skip the unit machining schedule. Therefore, a machining operation involved in a unit machining schedule that can give rise to a schedule alarm condition can be automatically skipped so that the possible suspension of the operation of the sheet metal machining line can be minimized to improve the efficiency of the operation of the line if the operator is not constantly monitoring the line as in the case of the operation of the line during the night shift. Thus, the operator is allowed to flexibly operate the sheet metal machining line by adequately responding to the circumstances and determining if the unit machining schedule should be skipped or not particularly when the unit machining schedule in question should be given priority.

Additionally, if it is determined that all the machining operation of the unit machining schedule in question is over by referring to the completion code of the machining schedule and then if a retry process for carrying out the skipped unit machining schedule or schedules once again or not according to the presence or absence of a retry mode arranged for the skipped unit machining schedule or schedules. Therefore, a skipped machining operation involved in a unit machining schedule can be carried out once again after all the machining operation of the unit machining schedule is over so that the possible suspension of the operation of the sheet metal machining line can be minimized to improve the efficiency of the operation of the line if the operator is not constantly monitoring the line as in the case of the operation of the line during the night shift. Furthermore, the machining operation of the skipped unit machining schedules that requires preparatory works can be carried out at the end of the machining schedule of the day.

The present invention is not limited to the above described embodiment, which may be modified in various different ways without departing from the scope of the invention.

For example, the NC machining center to be used in a sheet metal machining line provided with a work identifying apparatus according to the invention may be a turret punch press, a laser machining center, a bending machine or any other sheet metal machining center.

While machining schedules are stored in both the cell controller and the parent server in the above embodiment, the present invention is not limited thereto and many other form of schedule storage may be used for the purpose of the invention so long as the cell controller stores necessary machining schedules.

As described above in detail, with the present invention, an unfavorable situation that can force the operation of the line of manufacturing products of a specific item to be suspended for reasons such as no available workpieces and/or a preparatory work to be done such as an exchange of metal molds that can arise before or during the machining operation for the products by analyzing the unit machining schedule for the products including the data items described in the schedule such as the identification numbers of the machining programs involved, the use or non-use of such identification numbers, the number of workpieces to be machined and the presence or absence of the predetermined procedures for exchanging metal molds to be referred to for manufacturing the products, informing the operator of the foreseen situation or the non-existence of such a foreseen unfavorable situation in order to make the operator prepared for a possible suspension of the operation of the line.

Thus, the operator can see any possible schedule alarm condition and the cause thereof before the operation of machining the workpiece in question and, therefore, make him- or herself ready for the expected suspension of the operation of the sheet metal machining line.

Additionally, any unfavorable situation that can force the operation of the line of manufacturing products of a specific item to be suspended for reasons such as no machining program in position, no available workpieces and/or a preparatory work to be done such as an exchange of metal molds that can arise before or during the machining operation for the products can be predicted by analyzing the unit machining schedule or schedules for the products assigned as conforming to a predetermined order. If there is a foreseeable schedule alarm condition, it is determined if the machining operation should skip the assigned unit machining schedule or schedules and go to the succeeding unit machining schedule or not according the presence or absence of a skip mode arranged for the operation of the schedule or schedules and, then, the data items belonging to the unit machining schedule or schedules are updated by adding data for skipping the unit machining schedule or schedules to the completion code of the assigned unit machining schedule or schedules if it is determined in the preceding step that a skip mode is arranged. Therefore, a machining operation involved in a unit machining schedule that can give rise to a schedule alarm condition can be automatically skipped so that the possible suspension of the operation of the sheet metal machining line can be minimized to improve the efficiency of the operation of the line if the operator is not constantly monitoring the line as in the case of the operation of the line during the night shift.

Finally, any unfavorable situation that can force the operation of the line of manufacturing products of a specific item to be suspended for reasons such as no machining program in position, no available workpieces and/or a preparatory work to be done such as an exchange of metal molds that can arise before or during the machining operation for the products can be predicted by analyzing the unit machining schedule or schedules for the products assigned as conforming to a predetermined order. If there is a foreseeable schedule alarm condition, it is determined if the machining operation should skip the assigned unit machining schedule or schedules and go to the succeeding unit machining schedule or not according the presence or absence of a skip mode arranged for the operation of the schedule or schedules and, then, the data items belonging to the unit machining schedule or schedules are updated by adding data for skipping the unit machining schedule or schedules to the completion code of the assigned unit machining schedule or schedules if it is determined in the preceding step that a skip mode is arranged. Therefore, a machining operation involved in a unit machining schedule that can give rise to a schedule alarm condition can be automatically skipped so that the possible suspension of the operation of the sheet metal machining line can be minimized to improve the efficiency of the operation of the line if the operator is not constantly monitoring the line as in the case of the operation of the line during the night shift.

Thus, any unfavorable situation that can force the operation of the line of manufacturing products of a specific item to be suspended for reasons such as no machining program in position, no available workpieces and/or a preparatory work to be done such as an exchange of metal molds that can arise before or during the machining operation for the products can be predicted by analyzing the unit machining schedule or schedules for the products assigned as conforming to a predetermined order. If there is a foreseeable schedule alarm condition, it is determined if the machining operation should skip the assigned unit machining schedule or schedules and go to the succeeding unit machining schedule or not according the presence or absence of a skip mode arranged for the operation of the schedule or schedules and, then, the data items belonging to the unit machining schedule or schedules are updated by adding data for skipping the unit machining schedule or schedules to the completion code of the assigned unit machining schedule or schedules if it is determined in the preceding step that a skip mode is arranged. Thereafter, it is determined if all the machining operation of the unit machining schedule in question is over or not by referring to the completion code of the machining schedule and then if a retry process for realizing the skipped unit machining schedule or schedules should be carrier out once again and not according to the presence or absence of a retry mode arranged for the skipped unit machining schedule or schedules. Therefore, a skipped machining operation involved in a unit machining schedule can be carried out once again after all the machining operation of the unit machining schedule is over so that the possible suspension of the operation of the sheet metal machining line can be minimized to improve the efficiency of the operation of the line if the operator is not constantly monitoring the line as in the case of the operation of the line during the night shift.

It should be understood that many modifications and adaptations of the invention will become apparent to those skilled in the art and it is intended to encompass such obvious modifications and changes in the scope of the claims appended hereto.

What is claimed is:

1. A method of controlling a sheet metal machining line in accordance with a machining schedule, said machining schedule comprising unit machining schedules arranged in an order of machining operations to be carried out, each of said unit machining schedules being referred to for objects to be machined and containing data items including identification numbers of machining programs, a number of workpieces to be machined, a presence or absence of preparatory work to be performed, and a completion code for indicating a completion or non-completion of machining operations specified in the unit machining schedule, so that supplied workpieces may be sequentially machined by predetermined machining operations according to the machining schedule, said method comprising:

assigning each unit machining schedule, indicated as being non-complete by a completion code, in accordance with a predetermined order;

determining the presence of a foreseeable schedule alarm condition, that will cause an operation of the sheet metal machining line to be suspended before or during the machining operation for the assigned unit machining schedule, by analyzing the data items of the assigned unit machining schedule; and notifying an operator of the presence of said foreseeable schedule alarm condition if it is determined that said foreseeable schedule alarm condition is present.

2. A method of controlling a sheet metal machining line according to claim 1, wherein said notifying includes indicating to the operator the cause of said foreseeable alarm condition when it is determined that said foreseeable schedule alarm condition is present.

3. A method of controlling a sheet metal machining line according to claim 1, wherein said determining the presence of a foreseeable schedule alarm comprises determining whether an identification number of a machining program required to machine a workpiece is stored in the assigned unit machining schedule based on the data items of the assigned unit machining schedule.

4. A method of controlling a sheet metal machining line according to claim 1, wherein said determining the presence of a foreseeable schedule alarm comprises comparing workpiece inventory data with the data items of the assigned unit machining schedule, in order to determine if the number of available workpieces is less than the required number of workpieces for machining.

5. A method of controlling a sheet metal machining line according to claim 1, wherein said determining the presence of a foreseeable schedule alarm comprises comparing metal mold and clamp data with the data items of the assigned unit machining schedule, in order to determine if preparatory work is required.

6. A method of controlling a sheet metal machining line in accordance with a machining schedule, said machining schedule comprising at least one unit machining schedule, each unit machining schedule being referred to for objects to be machined and containing data items including identification numbers of machining programs, a number of workpieces to be machined, a presence or absence of preparatory work to be performed, and a completion code for indicating a completion or non-completion of machining operations specified in the unit machining schedule, so that supplied workpieces may be sequentially machined by predetermined machining operations according to the machining schedule, said method comprising:

assigning each unit machining schedule, indicated as being non-complete by a completion code, in accordance with a predetermined order;

determining the presence of a foreseeable schedule alarm condition, that will force an operation of the sheet metal machining line to be suspended before or during the machining operation for the assigned unit machining schedule, by analyzing the data items of the assigned unit machining schedule;

determining, when a foreseeable schedule alarm condition is determined to be present, whether the assigned unit machining schedule should be skipped in accordance with a skip mode, said skip mode being provided for the operation of the assigned unit machining schedule; and updating the data items of the assigned unit machining schedule by adding data indicating the skipping of the assigned unit machining schedule to the completion code of the assigned unit machining schedule if it is determined that said skip mode is provided.

7. A method of controlling a sheet metal machining line in accordance with a machining schedule, said machining schedule comprising unit machining schedules arranged in an order of machining operations to be carried out, each of said unit machining schedules containing data items including identification numbers of machining programs, a number of workpieces to be machined, a presence or absence of preparatory work to be performed, and a completion code for indicating a completion or non-completion of machining operations specified in the unit machining schedule, so that supplied workpieces may be sequentially machined by predetermined machining operations according to the machining schedule, said method comprising:

assigning each unit machining schedule, indicated as being non-complete by a completion code, in accordance with a predetermined order;

determining the presence of a foreseeable schedule alarm condition, that will force an operation of the sheet metal machining line to be suspended before or during the machining operation for the assigned unit machining schedule, by analyzing the data items of the assigned unit machining schedule;

determining, when said foreseeable schedule alarm condition is determined to be present, whether the assigned unit machining schedule should be skipped in accordance with a skip mode, said skip mode being provided for the operation of the unit machining schedule; and updating the data items of the assigned unit machining schedule by adding data indicating the skipping of the assigned unit machining schedule to the completion code of the assigned unit machining schedule when it is determined that said skip mode is provided;

determining if all machining operations of the unit machining schedules are complete by referring to the completion code of each unit machining schedule; and determining, when it is determined that all machining operations of the unit machining schedules are complete, whether a retry process for retrying a skipped unit machining schedule is to be performed in accordance with a retry mode provided for the skipped unit machining schedule.

8. An apparatus for controlling a sheet metal machining line in accordance with a machining schedule, said machining schedule comprising a plurality of unit machining schedules arranged in an order of machining operations to be carried out, each of said unit machining schedules being referred to for objects to be machined and containing data items including identification numbers of machining programs, a number of workpieces to be machined, a presence or absence of preparatory work to be performed, and a completion code for indicating the completion or non-completion of machining operations specified in the unit machining schedule, so that supplied workpieces may be sequentially machined by predetermined machining operations according to the machining schedule, said apparatus comprising:

assigning means for assigning each unit machining schedule, indicated as being non-complete by a completion code, in accordance with a predetermined order;

alarm condition determining means for determining the presence of a foreseeable schedule alarm condition, that will cause an operation of the sheet metal machining line to be suspended before or during the machining operation for the assigned unit machining schedule, by analyzing the data items of the assigned unit machining schedule; and alarm condition notifying means for notifying an operator of the presence of said foreseeable schedule alarm condition when it is determined that said foreseeable alarm condition is present.

9. An apparatus for controlling a sheet metal machining line according to claim 8, wherein said alarm condition notifying means comprises a display device to notify an operator of the cause of said foreseeable schedule alarm condition when it is determined that said foreseeable schedule alarm condition is present.

10. An apparatus for controlling a sheet metal machining line according to claim 8, wherein said alarm condition determining means comprises means for determining whether an identification number of a machining program required to machine a workpiece is stored in the assigned unit machining schedule based on the data items of the assigned unit machining schedule.

11. An apparatus for controlling a sheet metal machining line according to claim 8, wherein said alarm condition determining means comprises means for comparing workpiece inventory data with the data items of the assigned unit machining schedule, in order to determine if the number of available workpieces is less than the required number of workpieces for machining.

12. An apparatus for controlling a sheet metal machining line according to claim 8, wherein said alarm condition determining means comprises means for comparing metal mold and clamp data with the data items of the assigned unit machining schedule, in order to determine if preparatory work is required.

13. An apparatus for controlling a sheet metal machining line in accordance with a machining schedule, said machining schedule comprising unit machining schedules arranged in an order of machining operations to be carried out, each of said unit machining schedules being referred to for objects to be machined and containing data items including identification numbers of machining programs, a number of workpieces to be machined, a presence or absence of preparatory work to be performed, and a completion code for indicating the completion or non-completion of machining operations specified in the unit machining schedule, so that supplied workpieces may be sequentially machined by predetermined machining operations according to the machining schedule, said apparatus comprising:

assigning means for assigning each unit machining schedule, indicated as being non-complete by a completion code, in accordance with a predetermined order;

alarm condition determining means for determining the presence of a foreseeable schedule alarm condition, that will force an operation of the sheet metal machining line to be suspended before or during the machining operation for the assigned unit machining schedule, by analyzing the data items of the assigned unit machining schedule;

skip mode determining means for determining, when said alarm condition determining means determines that said foreseeable schedule alarm condition is present, whether to skip the assigned unit machining schedule in accordance with a skip mode, said skip mode being provided for an operation of the assigned unit machining schedule; and data updating means for updating, when it is determined by said skip mode determining means that said skip mode is provided, the data items of the assigned unit machining schedule by adding data indicating the skipping of the assigned unit machining schedule to the completion code of the assigned unit machining schedule.

14. An apparatus for controlling a sheet metal machining line in accordance with a machining schedule, said machining schedule comprising at least one unit machining schedule, each unit machining schedule being referred to for objects to be machined and containing data items including identification numbers of machining programs, a number of workpieces to be machined, a presence or absence of preparatory work to be performed, and a completion code for indicating the completion or non-completion of machining operations specified in each unit machining schedule, so that supplied workpieces may be sequentially machined by predetermined machining operations according to the machining schedule, said apparatus comprising:

assigning means for assigning each unit machining schedule, indicated as being non-complete by a completion code, in accordance with a predetermined order;

alarm condition determining means for determining the presence of a foreseeable schedule alarm condition, that will force an operation of the sheet metal machining line to be suspended before or during the machining operation for the assigned the assigned unit machining schedule, by analyzing the data items of the assigned unit machining schedule;

skip mode determining means for determining, when said foreseeable schedule alarm condition is determined to be present by said alarm condition determining means, whether to skip the assigned unit machining schedule in accordance with a skip mode, said skip mode being provided for an operation of the assigned unit machining schedule;

data updating means for updating, when it is determined by said skip mode determining means that a skip mode is provided, the data items of the assigned unit machining schedule by adding data for skipping the assigned unit machining schedule to the completion code of the assigned unit machining schedule;

completion determining means for determining if all the machining operations of the machining schedule are complete by referring to the completion code of each unit machining schedule; and retry process determining means for determining, when it is determined by said completion determining means that all of the machining operations are complete, if a retry process for retrying a skipped unit machining schedule is to be performed in accordance with a retry mode provided for the skipped unit machining schedule.

15. An apparatus for controlling a sheet metal machining line in accordance with a machining schedule, said machining schedule comprising machining records arranged in an order of machining operations to be carried out, each of said machining records being referred to for objects to be machined and containing data items including identification numbers of machining programs, a number of workpieces to be machined, a presence or absence of preparatory work to be performed, and a completion code for indicating the completion or non-completion of machining operations specified in each machining record, such that workpieces may be sequentially machined according to the machining schedule, said apparatus comprising:

an assigning system which assigns each machining record, indicated as being non-complete by a completion code, in accordance with a predetermined order;

an alarm condition determining system which determines the presence of a foreseeable schedule alarm condition that will force an operation of the sheet metal machining line to be suspended before or during the machining operation for the assigned machining record, said alarm condition determining system determining said foreseeable schedule alarm condition by analyzing the data items of the assigned machining record; and an alarm condition notification system which notifies an operator of said foreseeable schedule alarm condition when said alarm condition determining system determines the presence of said foreseeable schedule alarm condition.

16. An apparatus for controlling a sheet metal machining line according to claim 15, wherein said alarm condition notification system notifies an operator of a cause of said foreseeable schedule alarm condition.

17. An apparatus for controlling a sheet metal machining line according to claim 15, wherein said alarm condition determining system comprises means for determining whether an identification number of a machining program required to machine a workpiece is stored in the assigned machining record based on the data items of the assigned machining record.

18. An apparatus for controlling a sheet metal machining line according to claim 15, wherein said alarm condition determining system comprises means for comparing workpiece inventory data with the data items of the assigned machining record, in order to determine if the number of available workpieces is less than the required number of workpieces for machining.

19. An apparatus for controlling a sheet metal machining line according to claim 15, wherein said alarm condition determining system comprises means for comparing metal mold and clamp data with the data items of the assigned machining record, in order to determine if preparatory work is required.

20. An apparatus for controlling a sheet metal machining line in accordance with a machining schedule, said machining schedule comprising a plurality of machining records arranged in an order of machining operations to be carried out, each of said machining records being referred to for objects to be machined and containing data items including identification numbers of machining programs, a number of workpieces to be machined, a presence or absence of preparatory work to be performed, and a completion code for indicating the completion or non-completion of machining operations specified in each machining record, such that workpieces may be sequentially machined according to said at least one machining record, said apparatus comprising:

an assigning system which assigns each machining record, indicated as being non-complete by a completion code, in accordance with a predetermined order;

an alarm condition determining system which determines, prior to performing the machining operations of the assigned machining record, the presence of a foreseeable schedule alarm condition that will cause an operation of the sheet metal machining line to be suspended before or during the machining operations for the assigned machining record, said alarm condition determining system determining said foreseeable schedule alarm condition by analyzing the data items of the assigned machining record;

a skip mode determining system which determines, if said foreseeable schedule alarm condition is determined to be present by said alarm condition determining system, whether to skip an assigned machining record in accordance with a skip mode, said skip mode being provided for a machining operation of the assigned machining record; and a data updating system which updates, when it is determined by said skip mode determining system that said skip mode is provided, the data items of the assigned machining record by adding data indicating the skipping of the assigned machining record to the completion code of the assigned machining record.

21. An apparatus for controlling a sheet metal machining line according to claim 20, further comprising:

a completion determining system which determines if all machining operations of the machining records are complete by referring to the completion code of each of the machining records; and a retry process determining system which retries a skipped machining record in accordance with a retry mode provided for the skipped machining record if it is determined by said completion determining system that all machining operations are complete.

* * * * *

UNITED STATES PATENT AND TRADEMARK OFFICE
CERTIFICATE OF CORRECTION

PATENT NO. : 5,880,965
DATED : March 9, 1999
INVENTOR(S) : K. NAKAMURA et al.

It is certified that error appears in the above-identified patent and that said Letters Patent is hereby corrected as shown below:

On the cover of the printed patent, item [76], line 4, Higashirinkah- should be ---Higashirinkan---.

At column 24, line 41 (claim 14, line 22) of the printed patent, delete "the assigned" (first occurrence).

Signed and Sealed this

Twenty-third Day of May, 2000

Attest:

Q. TODD DICKINSON

*Attesting Officer*  *Director of Patents and Trademarks*